United States Patent
Briand et al.

(10) Patent No.: US 9,321,132 B2
(45) Date of Patent: Apr. 26, 2016

(54) HYBRID ARC/LASER-WELDING METHOD FOR ALUMINIZED STEEL PARTS USING GAMMAGENIC ELEMENTS AND A GAS CONTAINING LESS THAN 10% OF NITROGEN OR OXYGEN

(75) Inventors: Francis Briand, Houston, TX (US); Olivier Dubet, Houston, TX (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 232 days.

(21) Appl. No.: 13/809,652

(22) PCT Filed: May 5, 2011

(86) PCT No.: PCT/FR2011/051016
§ 371 (c)(1),
(2), (4) Date: Jan. 11, 2013

(87) PCT Pub. No.: WO2012/007664
PCT Pub. Date: Jan. 19, 2012

(65) Prior Publication Data
US 2013/0098878 A1   Apr. 25, 2013

(30) Foreign Application Priority Data
Jul. 13, 2010 (FR) ..................... 10 55690

(51) Int. Cl.
| | |
|---|---|
| *B23K 9/00* | (2006.01) |
| *B23K 35/38* | (2006.01) |
| *B23K 26/00* | (2014.01) |
| *B23K 28/02* | (2014.01) |
| *B23K 26/14* | (2014.01) |
| *B23K 35/02* | (2006.01) |
| *B23K 35/30* | (2006.01) |
| *B23K 26/32* | (2014.01) |

(52) U.S. Cl.
CPC ............. *B23K 28/02* (2013.01); *B23K 26/1429* (2013.01); *B23K 26/211* (2015.10); *B23K 26/322* (2013.01); *B23K 35/0261* (2013.01); *B23K 35/306* (2013.01); *B23K 35/3066* (2013.01); *B23K 35/3073* (2013.01); *B23K 35/383* (2013.01); *B23K 2201/006* (2013.01); *B23K 2201/34* (2013.01); *B23K 2203/04* (2013.01)

(58) Field of Classification Search
CPC ............. B23K 35/0261; B23K 35/306; B23K 35/3066; B23K 35/3073; B23K 35/383; B23K 28/02; B23K 26/1429; B23K 26/203; B23K 26/3293
USPC ......... 219/74, 76.14, 121.11, 121.15, 121.33, 219/121.6, 121.64
See application file for complete search history.

(56) References Cited

U.S. PATENT DOCUMENTS

| | | |
|---|---|---|
| 3,111,434 A | 11/1963 | Zenichiro et al. |
| 4,196,336 A | 4/1980 | Smoller et al. |
| 6,111,219 A | 8/2000 | Macedo et al. |
| 6,637,642 B1 | 10/2003 | Lingnau |
| 2001/0047984 A1 | 12/2001 | Briand et al. |
| 2001/0052511 A1 | 12/2001 | Briand et al. |
| 2002/0008094 A1 | 1/2002 | Briand et al. |
| 2004/0060908 A1 | 4/2004 | Trube et al. |
| 2005/0011868 A1 | 1/2005 | Matile et al. |
| 2005/0155960 A1 | 7/2005 | Bonnet |
| 2006/0289394 A1 | 12/2006 | Revel et al. |
| 2007/0045237 A1 | 3/2007 | Matz et al. |
| 2008/0011720 A1* | 1/2008 | Briand et al. .................... 219/61 |
| 2008/0057341 A1* | 3/2008 | Bouillot et al. ............... 428/685 |
| 2008/0230528 A1 | 9/2008 | Wilhelm |
| 2009/0220815 A1 | 9/2009 | Canourgues et al. |
| 2009/0236319 A1 | 9/2009 | Matz |
| 2010/0012638 A1 | 1/2010 | Fortain et al. |
| 2010/0122982 A1 | 5/2010 | Kurita et al. |

(Continued)

FOREIGN PATENT DOCUMENTS

| | | |
|---|---|---|
| DE | 133 538 | 1/1979 |
| DE | 198 31 831 | 4/1998 |

(Continued)

OTHER PUBLICATIONS

FR 1055690, French Search Report and Written Opinion, Feb. 8, 2011 (5 pages).
PCT/FR2011/051016, International Search Report and Written Opinion, Aug. 8, 2011 (10 pages).
Lyttle, K.A., "Shielding gases," ASM Handbook, vol. 6, ASM International, ISBN 0-87170-382-2, 1993, 64-65.
French Search Report and Written Opinion for related FR 1055688, Feb. 7, 2011.
International Search Report and Written Opinion for related PCT/FR2011/051014, Aug. 8, 24, 2011.
French Search Report and Written Opinion for related FR 1055689, Feb. 7, 2011.
International Search Report and Written Opinion for related PCT/FR2011/051013, Aug. 1, 2011.
French Search Report and Written Opinion for related FR 1055691, Feb. 8, 2011.
International Search Report and Written Opinion for related PCT/FR2011/051015, Aug. 8, 2011.

*Primary Examiner* — Dana Ross
*Assistant Examiner* — Lindsey C Teaters
(74) *Attorney, Agent, or Firm* — Elwood L. Haynes

(57) ABSTRACT

The invention relates to a hybrid laser/arc-welding method using an electric arc and a laser beam that are combined together within a single welding melt to which molten metal is supplied by melting a filler wire, wherein the welding melt is provided on at least one steel part including an aluminum surface coating, and a protective gas is used, characterized in that the filler wire contains at least 3 wt % of one or more gammagenic elements, in particular the gammagenic elements selected from C, Mn, Ni and N, and the protective gas consists of helium and/or argon with the addition of at least 10 vol % of nitrogen or oxygen. The method of the invention is particularly suitable for welding end-welded flanks used in the field of manufacturing automobiles or for tube welding.

13 Claims, No Drawings

(56) References Cited

U.S. PATENT DOCUMENTS

| | | |
|---|---|---|
| 2010/0219172 A1 | 9/2010 | Schweighardt |
| 2011/0226746 A1 | 9/2011 | Briand et al. |
| 2013/0105445 A1 | 5/2013 | Bertin et al. |
| 2013/0112663 A1 | 5/2013 | Bertin et al. |

FOREIGN PATENT DOCUMENTS

| | | |
|---|---|---|
| EP | 0 417 595 | 3/1991 |
| EP | 1380380 | 1/2004 |
| EP | 1878531 | 1/2008 |
| JP | S55 24739 | 2/1980 |
| JP | 2000 197971 | 7/2000 |
| JP | 2003 019564 | 1/2003 |
| JP | 2003220481 | 8/2003 |
| JP | 2006 116599 | 5/2006 |
| JP | 2010 110787 | 5/2010 |
| KR | 20010057596 | 7/2001 |

\* cited by examiner

HYBRID ARC/LASER-WELDING METHOD FOR ALUMINIZED STEEL PARTS USING GAMMAGENIC ELEMENTS AND A GAS CONTAINING LESS THAN 10% OF NITROGEN OR OXYGEN

CROSS-REFERENCE TO RELATED APPLICATIONS

This application is a §371 of International PCT Application PCT/FR2011/051016 filed May 5, 2011, which claims §119(a) foreign priority to French patent application 1055690, filed Jul. 13, 2010.

FIELD OF THE INVENTION

The invention relates to a laser/arc hybrid welding process for welding steel workpieces comprising an aluminum-based surface coating, in particular an aluminum/silicon coating, the process using a wire containing one or more gammagenic elements and preferably a shielding gas formed of argon and/or helium and a small proportion of nitrogen or oxygen.

BACKGROUND

Certain steels, such as USIBOR™ steels, referred to as aluminized steels because they are coated with aluminum or with an aluminum-based alloy, have very high mechanical properties after hot-drawing and are therefore increasingly used in the field of automobile manufacturing when a weight saving is desired.

Specifically, these steels are designed to be heat treated and then quenched during the hot-drawing operation, the mechanical properties thus obtained enabling a very significant reduction in the weight of the vehicle relative to standard high yield strength steel. These steels are mainly used to manufacture bumper beams, door reinforcements, center pillars, window pillars, etc.

Document EP-A-1878531 suggests welding aluminized steels of this type using a laser/arc hybrid welding process. The laser/arc hybrid welding principle is well known in the prior art.

However, in practice it has been observed that a phase with a lower tensile strength than the base metal and than the weld-metal zone often appears in the welded joint after steel workpieces coated with aluminum or with an aluminum alloy, especially an Al/Si alloy, have been subjected to a hybrid welding operation using a shielding atmosphere formed of a He/Ar mixture and a post-welding heat treatment comprising hot-drawing at 920° C. and then quenching in the tool (at 30° C./s).

Specifically, this lower-tensile-strength phase forms a brittle region in the weld thus obtained, as explained below. These more brittle regions appear in the martensite zone in the form of white-phase islands containing aggregates of aluminum from the surface layer.

Analysis has shown that this phase contains a significant percentage of aluminum (>2%) which prevents austenitic transformation of the steel during its pre-drawing heat treatment, i.e. this phase remains in delta-ferrite form and as a result is softer than the rest of the workpiece, which undergoes a martensitic/bainitic transformation.

During mechanical testing of the joint, after the welding, drawing and subsequent heat treatment, the phase that has not made the martensite transformation may cause the welded joint to crack or even shear because, since these regions of the weld contain aluminum, they are weaker than the deposited metal.

The problem that is faced is how to provide an arc/laser hybrid welding process that improves the mechanical properties of the weld produced in an operation for welding steel workpieces coated with an aluminum-comprising layer. More specifically, the problem is how to obtain a uniform martensite microstructure in the weld-metal zone, i.e. in the weld, after hot-drawing, typically at around 920° C., and quenching in the drawing tool, typically at a cooling rate, between 800° C. and 500° C., of about 30° C./s.

SUMMARY OF THE INVENTION

The solution of the invention is thus a laser/arc hybrid welding process using an electric arc and a laser beam in combination together in a single weld pool, in which the weld metal is provided by melting a consumable wire, the weld pool being produced in at least one steel workpiece comprising an aluminum-based surface coating, and using a shielding gas, characterized in that the consumable wire contains at least 3 wt % of one or more gammagenic elements and the shielding gas is formed of helium and/or argon and at least 10 vol % of nitrogen or oxygen, as additional component(s).

Depending on the circumstances, the process of the invention may comprise one or more of the following features:
- the gammagenic elements are chosen from carbon (C), manganese (Mn), nickel (Ni) and nitrogen (N);
- the consumable wire at least contains Mn;
- the gammagenic elements may be provided in the form of a metal or alloy, being a carbon-containing ferroalloy or graphite for example, for carbon, electrolytic manganese or a ferroalloy for manganese, elementary nickel, or a nitrogen-containing ferrochrome for nitrogen, in particular for a metal-cored wire;
- the consumable wire contains a plurality of gammagenic elements chosen from C, Mn, Ni and N.
- the consumable wire contains at least 5 wt % of one or more gammagenic elements;
- the wire contains at most about 20 wt % of gammagenic elements;
- the consumable wire furthermore contains iron;
- the wire is a cored wire, especially a metal-cored wire, or a solid wire;
- the shielding gas contains a mixture of helium and argon;
- the shielding gas is formed of helium and/or argon and less than 9 vol % nitrogen or oxygen, preferably nitrogen because the presence of nitrogen in the gas in particular provides additional gammagenic elements;
- the shielding gas contains at least 2 vol % of said at least one additional $O_2$ or $N_2$ component;
- the shielding gas contains at least 4 vol % nitrogen as an additional component;
- the shielding gas contains at least 5 vol % nitrogen as an additional component;
- the shielding gas contains at most 8 vol % nitrogen as an additional component;
- the shielding gas contains at least 5.5 vol % nitrogen and at most 7.5 vol % nitrogen;
- the nitrogen content in the shielding gas used is about 6 to 7% nitrogen in argon or in a helium/argon mixture;
- the oxygen content is lower than 8 vol % in argon or in argon/helium;
- the oxygen content is about 3 to 5% oxygen in argon or in argon/helium;

the shielding gas is formed of helium and/or argon and from 4 to 8 vol % nitrogen;

the one or more steel workpieces comprise an aluminum-based surface coating having a thickness of between 5 and 100 μm, and preferably of 50 μm or less;

the one or more metal workpieces are made of steel with a surface coating based on aluminum and silicon, the surface coating preferably containing more than 70 wt % aluminum;

the one or more metal workpieces are made of carbon steel;

the consumable wire is melted by the electric arc, preferably an arc obtained by means of an MIG welding torch;

the laser generator generating the laser beam is of the $CO_2$, fiber, or disk type;

the one or more workpieces to be welded are chosen from tailored blanks, and tubes;

a plurality of workpieces are welded together, in particular two workpieces;

the workpieces are positioned and welded in square butt configuration;

the one or more workpieces to be welded are from 0.2 mm to 3 mm in thickness, the thickness in the plane of the weld to be produced being considered, i.e. in the location where the metal is melted to form the weld, for example level with an edge face of the workpiece or workpieces to be welded;

the coating covers at least one surface of the one or more workpieces, but preferably no or almost no aluminum-based coating is present on the end rims of the one or more workpieces, i.e. on the edge faces of a sheet for example;

the one or more metal workpieces comprise a surface coating based on aluminum and silicon containing a proportion of aluminum between 5 and 100 times greater than that of silicon, for example a proportion of aluminum of 90 wt % and a proportion of silicon of 10 wt % i.e. the surface coating layer comprises 9 times more aluminum than silicon;

the one or more metal workpieces comprise a surface coating based on aluminum and silicon containing a proportion of aluminum between 5 and 50 times greater than that of silicon, especially a proportion of aluminum between 5 and 30 times greater than that of silicon, in particular a proportion of aluminum between 5 and 20 times greater than that of silicon;

a plurality of workpieces are welded together, typically two workpieces, said workpieces possibly being identical or different, especially in terms of shape, thickness, etc.;

the steel workpieces are made of high-alloy steel (>5 wt % alloying elements), low-alloy steel (<5 wt % alloying elements) or unalloyed steel, carbon steel for example;

the welding wire is a solid wire or a cored wire having a diameter between 0.5 and 5 mm and typically between about 0.8 and 2.5 mm;

the laser beam precedes the MIG arc during the welding, when the welding direction is considered;

the MIG welding regime is of the short arc type;

the welding voltage is below 20 V and typically between 11 and 16 V;

the welding current is below 200 A and typically between 118 and 166 A;

the welding speed is below 20 m/min and typically between 4 and 6 m/min;

the pressure of the gas is between 2 and 15 bar and for example about 4 bar;

the flow rate of the gas is between 5 and 40 l/min and typically about 25 l/min;

the focal point of the laser beam is focused above the workpiece to be welded, preferably at a distance of between 3 and 6 mm; and the distance between the filler wire and the laser beam must be between about 2 and 3 mm.

The invention will now be better understood by virtue of the following examples intended to demonstrate the effectiveness of the laser/arc hybrid welding process according to the invention.

DETAILED DESCRIPTION OF THE INVENTION

For this purpose, laser/arc hybrid welding trials were carried out, using a $CO_2$ laser source and an MIG arc welding torch, on steel workpieces coated with a layer of about 30 μm of an aluminum/silicon alloy in respective proportions of 90% and 10% by weight. More precisely, in examples 1 to 3 below, the workpieces to be welded were tailored blanks made of aluminized (Al/Si) Usibor 1500™ steel placed in square butt configuration.

In examples 1 to 3, the shielding gas used was distributed at a flow rate of 25 l/min and at a pressure of 4 bar, and the welding speed was 4 m/min. The welding voltage of about 15 V and the current of about 139 A were obtained by virtue of a Digi@wave 500 (short arc/short arc+) in synergetic mode (EN 131) sold by Air Liquide Welding France.

EXAMPLE 1

The workpieces were, in this example, 1.7 mm in thickness.

The gas employed was an ARCAL 37 mixture (composition: 70 vol % He+30 vol % Ar) to which 3 vol % $O_2$ was added—the ARCAL 37 gas mixture is available for sale from Air Liquide.

The torch used was an MIG torch sold by OTC, which was fed with a 1.2 mm-diameter filler wire, containing, in addition to iron, about 20 wt % manganese (Mn), delivered at a rate of 3 m/min.

The laser source was a $CO_2$ laser oscillator and the power employed was 8 kW.

The results obtained showed that, if the weld beads obtained had a uniform microstructure, the presence of a high proportion of manganese (i.e. about 20 wt % Mn) in the weld zone led to much better results than trials with little manganese in the weld bead (i.e. about 2% Mn).

After a quenching heat treatment (rate of cooling between 800° C. and 500° C. of about 30° C./sec) the tensile strength of the joint was equivalent to that of the base metal post-quenching, whereas the tensile strength did not exceed 1000 MPa (Rm) when the bead contained only 2% manganese.

This first example demonstrated that the presence of gammagenic elements, i.e. here 20% Mn, in the wire promoted weld beads with a uniform martensite microstructure in the weld-metal zone after quenching.

EXAMPLE 2

In this example the workpieces were 2.3 mm in thickness and the gas employed was a mixture formed of ARCAL 37 and 3 vol % $O_2$.

The torch used was an OTC MIG torch fed with a 1.2 mm-diameter Nic 535 (solid wire) filler wire comprising iron and, as gammagenic elements, 0.7% carbon (C) and 2% manganese (Mn), which wire was delivered at a rate of 3 m/min.

The laser source was a 12 kW $CO_2$ laser oscillator. The results obtained showed that the quantity of gammagenic elements, i.e. Mn and C, in the wire was sufficient to counter the austenitic transformation suppressing effect caused by the presence of aluminum in the weld-metal zone. Specifically, micrographs showed that the white phases had completely disappeared or had been greatly reduced.

Furthermore, it was observed that the tensile strength of the joint, after austenitization and quenching, was equivalent to that of the base metal.

This second example also demonstrated that the presence of gammagenic elements, i.e. here C and Mn, in the wire promoted weld beads with a uniform martensite microstructure in the weld-metal zone after quenching.

EXAMPLE 3

Example 3 is analogous to example 2 above except that the laser/arc hybrid welding process according to the invention was used to weld 2.3 mm-thick workpieces using, as a shielding gas, the ARCAL 37 mixture, which is formed of 70% helium and 30% argon, and 6% additional $N_2$.

The torch, the filler wire and the other welding conditions were identical to those in example 2.

By way of comparison, the ARCAL 37 mixture alone was also tested, i.e. no $N_2$ was added.

The results obtained showed that using, in combination, a wire containing gammagenic elements and a shielding gas formed by adding 6% $N_2$ to a mixture comprising 30% argon and 70% helium (i.e. ARCAL 37) led to better results than when the shielding gas did not contain nitrogen but the wire was the same.

Specifically, when nitrogen was present in the mixture, there was a significant improvement in the results, which improved proportionally to the $N_2$ content in the mixture. Thus micrographs showed that the white phases had completely disappeared, and moreover the tensile strength of the joint, after austenitization and quenching, was equivalent to that of the base metal.

The improvement was all the more significant the greater the nitrogen content but with an optimum below 10 vol %, which would suggest using about 6 to 7% nitrogen in argon or in an argon/helium mixture.

Generally, the results obtained in the trials (examples 1 to 3) clearly show that the presence of gammagenic elements in the consumable wire allows the quality of welding of steel coated with a surface layer made of an aluminum/silicon alloy to be substantially improved, and in particular a uniform martensite microstructure in the weld-metal zone to be obtained.

It will be noted that the improvement is all the more significant when:
  either the nitrogen content in the shielding gas is simultaneously increased but with an optimum below 10 vol %, which would suggest using about 6 to 7% nitrogen in argon or in argon/helium;
  or the oxygen content is increased but with an optimum below 10 vol %, which would suggest using about 3 to 5% oxygen in argon or in argon/helium.

The process of the invention is particularly suitable for welding tailored blanks used in the field of automobile manufacturing or for welding tubes.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A laser/arc hybrid welding process using an electric arc and a laser beam in combination together in a single weld pool, comprising;
  providing the weld metal by melting a consumable wire,
  producing the weld pool in at least one steel workpiece comprising an aluminum-based surface coating, and
  using a shielding gas,
wherein the consumable wire contains at least 3 wt % and at most 20 wt % of one or more gammagenic elements and the shielding gas is formed of at least 2 vol % to less than 10 vol % of nitrogen or oxygen, and helium or argon,
thereby promoting the formation of a uniform martensite microstructure in a weld-metal zone formed by hot-drawing and quenching.

2. The process of claim 1, wherein the gammagenic elements are chosen from C, Mn, Ni and N.

3. The process of claim 1, wherein the one or more steel work pieces comprise an aluminum-based surface coating having a thickness of between 5 and 100 μm.

4. The process of claim 1, wherein the one or more steel work pieces comprise an aluminum-based surface coating having a thickness of 50 μm or less.

5. The process of claim 1, wherein the one or more metal work pieces are made of steel with a surface coating based on aluminum and silicon (Al/Si).

6. The process of claim 1, wherein the one or more metal work pieces are made of steel with a surface coating based on aluminum and silicon, the surface coating containing more than 70 wt % aluminum.

7. The process of claim 1, wherein the consumable wire is melted by the electric arc.

8. The process of claim 1, wherein the laser generator generating the laser beam is of the CO2, fiber, or disk type.

9. The process of claim 1, wherein the one or more work pieces to be welded are chosen from tailored blanks and exhaust pipes or tubes.

10. The process of claim 1, wherein the consumable wire contains a plurality of gammagenic elements chosen from C, Mn, Ni and N.

11. The process of claim 1, wherein the consumable wire contains at least 5 wt % of one or more gammagenic elements.

12. The process of claim 1, wherein the consumable wire at least contains Mn.

13. The process of claim 1, wherein the consumable wire furthermore contains iron.

* * * * *